United States Patent
Ichige (10) Patent No.: US 10,154,255 B2
(45) Date of Patent: Dec. 11, 2018

(54) IN-VEHICLE-CAMERA IMAGE PROCESSING DEVICE

(71) Applicant: Hitachi Automotive Systems, Ltd., Hitachinaka-shi, Ibaraki (JP)

(72) Inventor: Atsushi Ichige, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 136 days.

(21) Appl. No.: 15/100,649

(22) PCT Filed: Nov. 28, 2014

(86) PCT No.: PCT/JP2014/081492
§ 371 (c)(1),
(2) Date: Jun. 1, 2016

(87) PCT Pub. No.: WO2015/104915
PCT Pub. Date: Jul. 16, 2015

(65) Prior Publication Data
US 2016/0301923 A1    Oct. 13, 2016

(30) Foreign Application Priority Data
Jan. 10, 2014  (JP) ................. 2014-003599

(51) Int. Cl.
*H04N 13/204* (2018.01)
*H04N 17/00* (2006.01)
(Continued)

(52) U.S. Cl.
CPC ....... *H04N 17/002* (2013.01); *G06K 9/00798* (2013.01); *G06K 9/00805* (2013.01);
(Continued)

(58) Field of Classification Search
CPC .............. H04N 17/002; G06K 9/00798
See application file for complete search history.

(56) References Cited

U.S. PATENT DOCUMENTS 6,115,489 A * 9/2000 Gupta ............... G06F 19/321
382/141
6,501,849 B1 * 12/2002 Gupta ............... G06F 19/321
382/141
(Continued)

FOREIGN PATENT DOCUMENTS

JP    9-113221 A    5/1997
JP    9-319873 A    12/1997
(Continued)

OTHER PUBLICATIONS

Extended European Search Report issued in counterpart European Application No. 14878010.9 dated Aug. 25, 2017 (eight pages).
(Continued)

*Primary Examiner* — Jayanti K Patel
*Assistant Examiner* — Irfan Habib
(74) *Attorney, Agent, or Firm* — Crowell & Moring LLP (57) ABSTRACT

The present invention inexpensively executes fault diagnosis in real time without obstructing an original image-processing function even while driving. To this end, this in-vehicle-camera image processing device has: one or more camera units capable of selectively switching between a captured image and a test image and outputting the same; an image-processing unit for subjecting a captured image outputted by the camera units to image processing; and a fault diagnosis unit for subjecting the camera units to fault diagnosis, on the basis of the test image outputted by the camera units. In addition, the image-processing unit determines whether or not a fault diagnosis is possible on the basis of the image-processing results, and when fault diagnosis is determined to be possible, outputs diagnosis instruction information to the fault diagnosis unit. The in-vehicle-camera image processing device is characterized in that upon receiving input of the diagnosis instruction information from the image-processing unit, the fault diagnosis unit
(Continued)

outputs, to the camera units, an image-selection-instruction signal for switching the image outputted by the camera units from the captured image to the test image.

6 Claims, 4 Drawing Sheets

(51) Int. Cl.
*H04N 7/18* (2006.01)
*H04N 5/232* (2006.01)
*G06K 9/00* (2006.01)
*H04N 13/239* (2018.01)
*H04N 13/00* (2018.01)
*B60R 11/04* (2006.01)

(52) U.S. Cl.
CPC ..... *G06K 9/00818* (2013.01); *G06K 9/00825* (2013.01); *H04N 5/23229* (2013.01); *H04N 7/181* (2013.01); *H04N 13/204* (2018.05); *H04N 13/239* (2018.05); *B60R 11/04* (2013.01); *H04N 2013/0096* (2013.01)

(56) References Cited

U.S. PATENT DOCUMENTS

| | | | | |
|---|---|---|---|---|
| 6,661,456 B1* | 12/2003 | Aufrichtig | ............. | A61B 6/583 348/247 |
| 6,681,344 B1* | 1/2004 | Andrew | ............. | G06F 11/0709 714/26 |
| 7,189,000 B2* | 3/2007 | Miyauchi | ................. | A61B 6/56 378/207 |
| 7,374,077 B2* | 5/2008 | Shimura | ........... | G06F 17/30259 235/375 |
| 7,557,858 B2* | 7/2009 | Honda | .................. | H04N 5/232 348/362 |
| 7,598,991 B2* | 10/2009 | Ishiga | ................. | H04N 17/002 348/241 |
| 8,279,279 B2* | 10/2012 | Hattori | ..................... | B60R 1/00 340/461 |
| 9,378,553 B2* | 6/2016 | Tamura | ............. | G06K 9/00791 |
| 9,467,687 B2* | 10/2016 | Takemura | ............ | H04N 17/002 |
| 10,015,529 B2* | 7/2018 | Guo | ................... | G06K 9/00771 |
| 2003/0202694 A1* | 10/2003 | Shima | .................. | G06K 9/4647 382/173 |
| 2004/0189448 A1* | 9/2004 | Eggers | ..................... | B60R 1/00 340/425.5 |
| 2006/0274170 A1* | 12/2006 | Azuma | .............. | H04N 5/23238 348/246 |
| 2008/0186384 A1* | 8/2008 | Ishii | .................... | H04N 17/002 348/187 |
| 2009/0030611 A1* | 1/2009 | Chen | ........................ | B60R 1/00 701/469 |
| 2009/0143967 A1* | 6/2009 | Lee | ............................ | B60R 1/00 701/119 |
| 2010/0157060 A1* | 6/2010 | Muramatsu | ............... | B60R 1/00 348/148 |
| 2010/0177176 A1* | 7/2010 | Hengstler | ................ | H04N 5/04 348/61 |
| 2016/0117831 A1* | 4/2016 | Nakashima | ............. | G06T 7/001 382/154 |

FOREIGN PATENT DOCUMENTS

| | | |
|---|---|---|
| JP | 2001-211466 A | 8/2001 |
| JP | 3400643 B2 | 4/2003 |
| JP | 2003-319120 A | 11/2003 |
| JP | 2005-73296 A | 3/2005 |
| JP | 2008-123498 A | 5/2008 |

OTHER PUBLICATIONS

International Search Report (PCT/ISA/210) issued in PCT Application No. PCT/JP2014/081492 dated Mar. 17, 2015 with English translation (5 pages).
Japanese-language Written Opinion (PCT/ISA/237) issued in PCT Application No. PCT/JP2014/081492 dated Mar. 17, 2015 (3 pages).

* cited by examiner

| DRIVING CONTROL APPLICATION | | | FAULT DIAGNOSIS | | | REMARK |
|---|---|---|---|---|---|---|
| TYPE | PRIORITY | DETECTION RESULT | ONLY CAMERA UNIT ON ONE SIDE | ALTERNATE BOTH (RIGHT AND LEFT) CAMERA UNITS | SIMULTANEOUS BOTH (RIGHT AND LEFT) CAMERA UNITS | |
| PRECEDING VEHICLE DETECTION | 1 | REMOTE AREA | ○ | △ | × | |
| | | NEAR FIELD | × | × | × | DIAGNOSIS IMPOSSIBLE |
| | | ABSENT | ○ | ○ | ○ | |
| PEDESTRIAN DETECTION | 2 | REMOTE AREA | ○ | △ | × | |
| | | NEAR FIELD | × | × | × | DIAGNOSIS IMPOSSIBLE |
| | | ABSENT | ○ | ○ | ○ | |
| ONCOMING VEHICLE DETECTION | 6 | REMOTE AREA | ○ | △ | × | |
| | | NEAR FIELD | × | × | × | DIAGNOSIS IMPOSSIBLE |
| | | ABSENT | ○ | ○ | ○ | |
| LANE DETECTION | 3 | PRESENT | ○ | △ | × | |
| | | ABSENT | ○ | ○ | ○ | |
| ROAD-SIDE DETECTION | 7 | PRESENT | ○ | △ | × | |
| | | ABSENT | ○ | ○ | ○ | |
| TRAFFIC-SIGNAL DETECTION | 5 | GREEN/YELLOW | △ | × | × | |
| | | RED | ○ | △ | △ | |
| TRAFFIC-SIGN DETECTION | 4 | SPEED LIMIT | ○ | △ | × | |
| | | STOP | ○ | △ | × | |

○ ··· APPLICABLE (FAULT DIAGNOSIS IS EXECUTABLE)
△ ··· APPLICABLE DEPENDING ON CONDITIONS (FAULT DIAGNOSIS IS EXECUTABLE DEPENDING ON CONDITIONS)
× ··· NOT APPLICABLE (FAULT DIAGNOSIS IS NOT EXECUTABLE)

PRIORITY 1: HIGH ··· 7: LOW

IN-VEHICLE-CAMERA IMAGE PROCESSING DEVICE

TECHNICAL FIELD

The present invention relates to an in-vehicle-camera image processing device.

BACKGROUND ART

PTL 1 discloses a technique of an image processing system which relatively compares frame images of respective video signals simultaneously obtained by a plurality of capturing units, and includes a self-diagnosis unit which performs a self-diagnosis of soundness of the plurality of capturing units according to the comparison result.

Then, PTL 2 discloses a technique of a fault determination unit which causes an exposure amount adjusting unit to change an exposure amount of the capturing unit to be increased or decreased when being in a predetermined operation status, and determines a fault based on whether the brightness of an image of the capturing unit is increased or decreased according to the increase or decrease of the exposure amount.

CITATION LIST

Patent Literature

PTL 1: Japanese Patent Application Laid-Open No. 2001-211466
PTL 2: Japanese Patent Application Laid-Open No. 2005-073296

SUMMARY OF INVENTION

Technical Problem

In the case of the system of PTL 1, there is a need to provide a circuit which is not necessary for an original image-processing function in order to recognize a defect of its own system, thereby causing a cost. Therefore, the system cannot be realized at a low price. For example, when a self-diagnosis function is realized by hardware or software of an image-processing CPU of the image processing system without newly providing a circuit in order to manufacture the system at a low price, a resource necessary for the original image processing is reduced, and the performance of an application necessary for realizing the original image-processing function is degraded.

In addition, in the case of the self-diagnosis function of PTL 2, the fault diagnosis can be executed only when a vehicle is stopped or driving at a low speed. For example, at the time of driving on an expressway, it is not possible to detect a fault even in a case where the fault occurs for a long period except traffic congestion. Recently, as with a pre-crash brake, the image processing is always required even at the time of driving a downtown. In particular, when a fault occurs in a capturing element which is the most essential portion in an in-vehicle-camera image processing device, there is a need to detect the fault timely as fast as possible.

The invention has been made in view of the above problems, and an object thereof is to provide an in-vehicle-camera image processing device which is realized at a low price and can perform fault diagnosis in real time without obstructing the original image-processing function even while driving.

Solution to Problem

For example, the configurations disclosed in claims are employed to solve the above problems.

An example of the plurality of means to solve the above problem of the present invention is an in-vehicle-camera image processing device which performs image processing on a captured image from the outside of a vehicle including: at least one camera unit which is able to selectively switch and output the captured image and a test image; an image-processing unit which performs image processing on the captured image output from the camera unit; and a fault diagnosis unit which performs a fault diagnosis on the camera unit based on the test image output from the camera unit, wherein the image-processing unit determines whether the fault diagnosis is possible based on a result of the image processing, and outputs diagnosis instruction information to the fault diagnosis unit in a case where it is determined that the fault diagnosis is possible, and wherein the fault diagnosis unit outputs an image-selection-instruction signal, for switching the image output from the camera unit from the captured image to the test image, to the camera unit in a case where the diagnosis instruction information is input from the image-processing unit.

Advantageous Effects of Invention

According to the invention, the fault diagnosis can be implemented at a low price and executed in real time even while driving without requiring hardware for the fault diagnosis, and without obstructing the original image-processing function necessary for the driving control of the image-processing CPU. Objects, configurations, and features other than those described above will become clear through the explanation about the following embodiments.

DESCRIPTION OF EMBODIMENTS

Hereinafter, embodiments of the invention will be described using the drawing.
[First Embodiment]

In this embodiment, the description will be made about an example of an in-vehicle-camera image processing device which performs fault diagnosis based on information of a driving control application executed by an image-processing unit.

Figure 1:
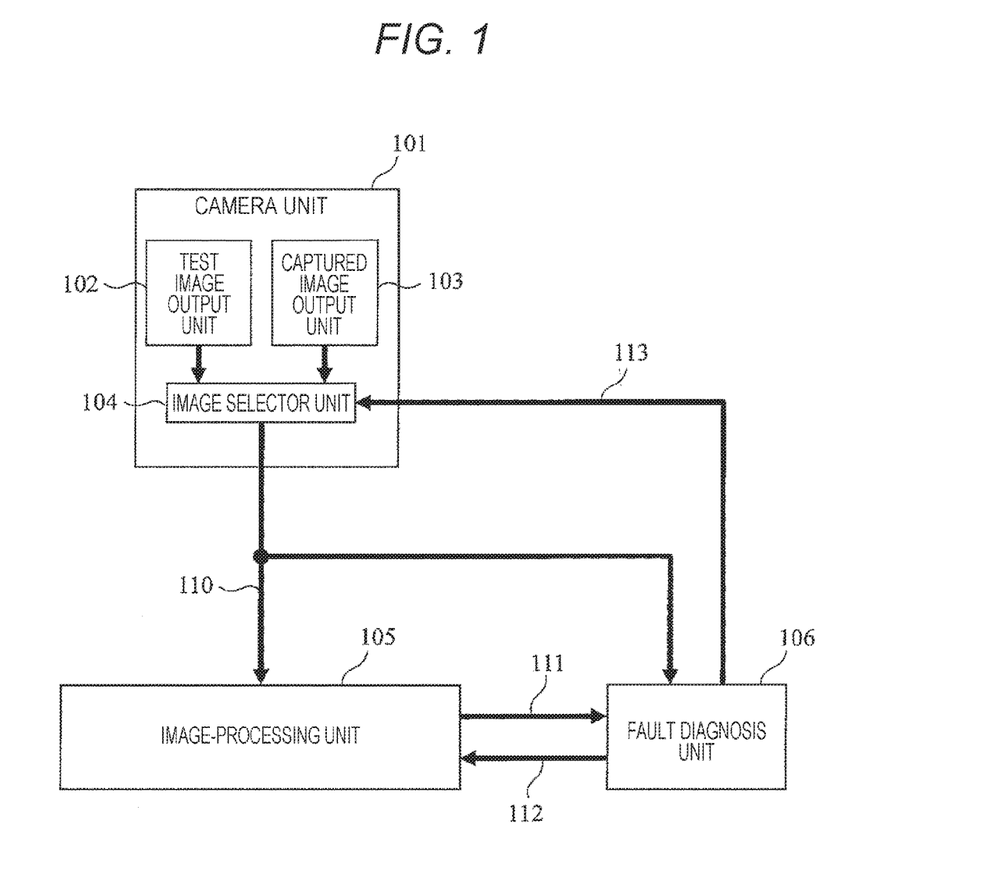
FIG. 1 is a diagram for describing a configuration of an in-vehicle-camera image processing device in a first embodiment.

FIG. 1 is a diagram for describing a configuration of the in-vehicle-camera image processing device of this embodiment. The in-vehicle-camera image processing device performs an image processing on a captured image obtained by capturing the outside from a vehicle, and includes a camera unit 101 which is mounted in the vehicle and captures the outside (the front side) of the vehicle. The camera unit 101 is configured by a capturing element such as a CCD image sensor or a CMOS image sensor, and includes a test image output unit 102 which outputs a predetermined test image and a captured image output unit 103 which outputs the captured image as a primary function of the capturing element. The test image output unit 102 can output the test image having a fixed pattern such as an even brightness image, a stripe image, and a color chart.

For example, the captured image output unit 103 includes an AD conversion unit which is necessary for the CCD image sensor. In addition, the captured image output unit also includes a function such as a CDS (correlated double sampling), a gain control, and an exposure control of a typical capturing element, and outputs digitalized image data.

The camera unit 101 includes the test image which is the image data output from the test image output unit 102 and an image selector unit 104 which selects and outputs any one of the captured images which are the image data output from the captured image output unit 103. The image selector unit 104 selectively switches the captured image and the test image, and outputs the selected image as camera image data 110. The camera image data 110 output from the camera unit 101 is input to an image-processing unit 105 and a fault diagnosis unit 106.

The image-processing unit 105 performs the image processing on the captured image output as the camera image data 110 from the camera unit 101. In the image-processing unit 105, the driving control application executes the image processing for a vehicle driving control using the captured image. Therefore, the image-processing unit serves as the in-vehicle-camera image processing device.

The fault diagnosis unit 106 executes the fault diagnosis of the camera unit 101 using diagnosis instruction information 111 output from the driving control application in the image-processing unit 105. The fault diagnosis of the camera unit 101 is performed based on the test image output as the camera image data 110 from the camera unit 101.

For example, in a case where the diagnosis instruction information 111 is information indicating that the fault diagnosis is possible, the test image output unit 102 is selected by the image selector unit 104 of the camera unit 101 based on a camera image-selection-instruction signal 113 in order to execute the fault diagnosis. When the test image output unit 102 is selected and the test image is output, a frame at the time is subjected to the fault diagnosis as a test image frame period.

For example, when the stripe image is output from the test image output unit 102, the stripe image is input to the fault diagnosis unit 106 as the camera image data 110 in the test image frame period. The fault diagnosis unit 106 has the information of stripe image in advance, and performs comparison with the stripe image input as the camera image data 110. At this time, for example, the stripe image of a correct value may be stored in a memory, and the stripe image of the correct value may be obtained from the outside such as the image-processing unit 105.

As a result of comparison performed in the fault diagnosis unit 106, in a case where there is a difference between the stripe image of the correct value and the stipe image input as the camera image data 110, it is determined that a fault occurs in an image data line, and diagnosis result information 112 is returned to the image-processing unit 105. The image-processing unit 105 determines that there is a high probability that an image processing result is abnormal based on the diagnosis result information 112, and stops using the image processing result in the driving control.

Alternatively, the image-processing unit adds information indicating that the image processing result is abnormal, and takes the control over to the next stage. Further, herein, the description has been made about an example of the stripe image as the test image. An image having a fixed brightness may be used as long as it can be compared, and any pattern of the image may be applied.

Figure 2:
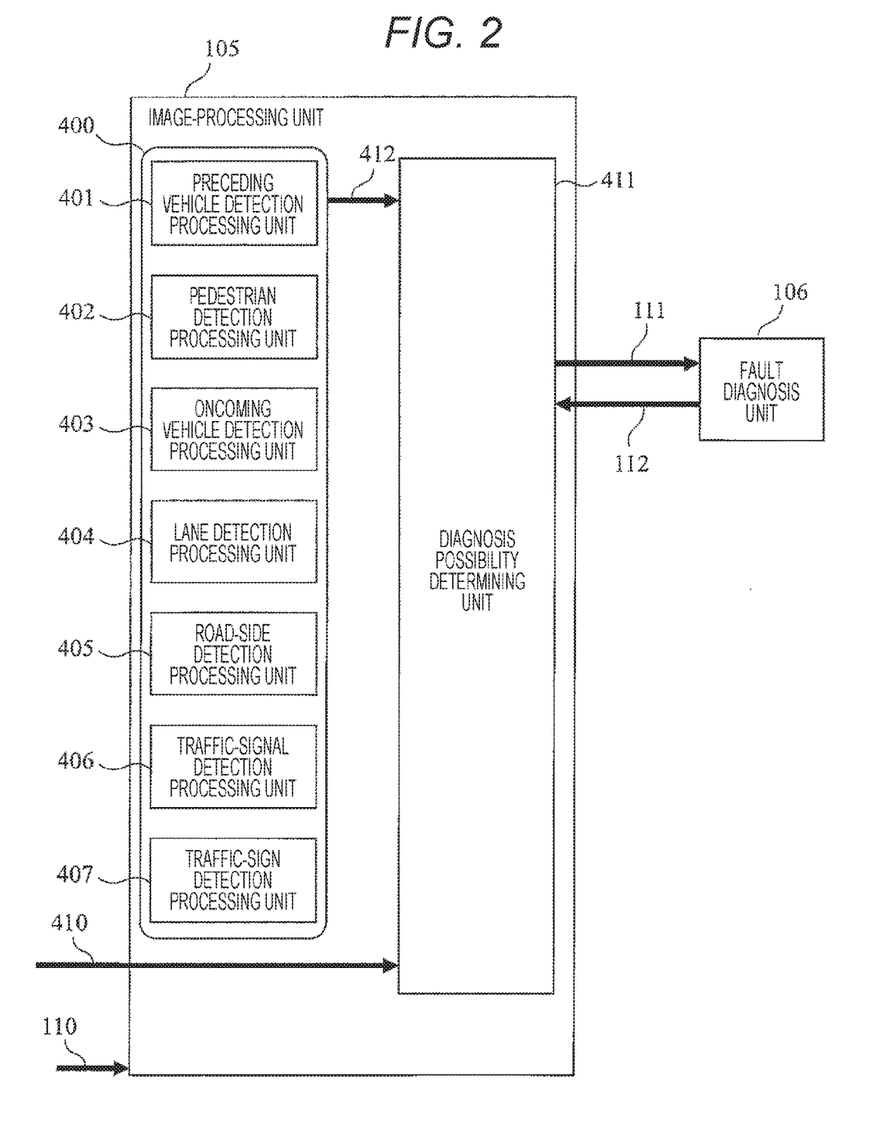
FIG. 2 is a diagram for describing a configuration of an image-processing unit.

FIG. 2 illustrates an example of an inner configuration of the image-processing unit. The image-processing unit 105 includes a driving control application 400 which performs various types of detection processing by subjecting the captured image of the camera unit 101 to the image processing, and a diagnosis possibility determining unit 411 which determines whether the fault diagnosis is possible based on driving control application information 412 as a detection processing result of the driving control application 400.

For example, the driving control application 400 includes, as an object detection processing unit which performs the detection processing on various types of objects, a preceding vehicle detection processing unit 401 which detects a preceding vehicle, a pedestrian detection processing unit 402 which detects a pedestrian, an oncoming vehicle detection processing unit 403 which detects an oncoming vehicle, a lane detection processing unit 404 which detects a lane such as a white lane, a road-side detection processing unit 405 which detects a road side represented as a guard rail and a side wall, a traffic-signal detection processing unit 406 which detects a traffic signal, and a traffic-sign detection processing unit 407 which detects a traffic sign such a vehicle speed sign.

The driving control application 400 may include an application related to a driving control (not mentioned herein). In addition, the diagnosis possibility determining unit 411 receives an external signal 410 such as vehicle speed information from the outside of the image-processing unit 105, which may be used in the fault diagnosis determination.

When the diagnosis possibility determining unit 411 determines that the fault diagnosis is possible, the diagnosis instruction information 111 is output from the image-processing unit 105 to the fault diagnosis unit 106. The fault diagnosis unit 106 outputs the camera image-selection-instruction signal 113 to the camera unit 101 to select the test image (see FIG. 1). The camera unit 101 outputs the predetermined test image, and the fault diagnosis unit 106 executes the fault diagnosis using the test image.

For example, in a case where the in-vehicle-camera image processing device performs a preceding vehicle recognition, and the preceding vehicle detection processing unit 401 in the driving control application 400 is activated. Then, as a result of preceding vehicle detection processing, in a case where the preceding vehicle is not detected in the front side of the subject vehicle and thus it is determined that there is no preceding vehicle, there is no problem even when the image from the camera unit 101 is switched from the captured image to the test image, the test image is temporally selected to perform the fault diagnosis.

Alternatively, even in a case where the traffic-signal detection processing unit 406 is activated, and it is determined that the traffic signal is switched from the green signal to the red signal while driving at the green signal as a result of the traffic-signal detection and the subject vehicle is stopped at the red signal, there is no problem even when the image from the camera unit 101 is switched from the captured image to the test image, the test image is temporally selected to perform the fault diagnosis.

Alternatively, in a case where the traffic-sign detection processing unit 407 is activated, and it is determined that a stop traffic sign is detected as a result of the traffic-sign detection and the subject vehicle is stopped, for example, based on a combination of the external signal 410 such as the vehicle speed information, there is no problem even when the image from the camera unit 101 is switched from the captured image to the test image, the test image is temporally selected to perform the fault diagnosis.

In this way, the fault diagnosis may be performed by combination of one result of the detection processing unit in the driving control application 400 or the result of a plurality of detection processing units.

Regarding the time of the fault diagnosis, for example, since it is enough to output a fixed image such as the stripe image described above once, only one frame may be switched to the test image. In the case of the in-vehicle-camera image processing device provided with a 30 fps camera unit, only 33.3 ms is necessary, so that the fault diagnosis can be executed while driving (in real time). Furthermore, an original image-processing function as the in-vehicle-camera image processing device can be executed without any obstruction.

According to the in-vehicle-camera image processing device of this embodiment, the fault diagnosis can be implemented at a low price and executed in real time even while driving without requiring additional hardware for the fault diagnosis, and without obstructing the original image-processing function necessary for the driving control of the image-processing CPU.

[Second Embodiment]

Figure 3:
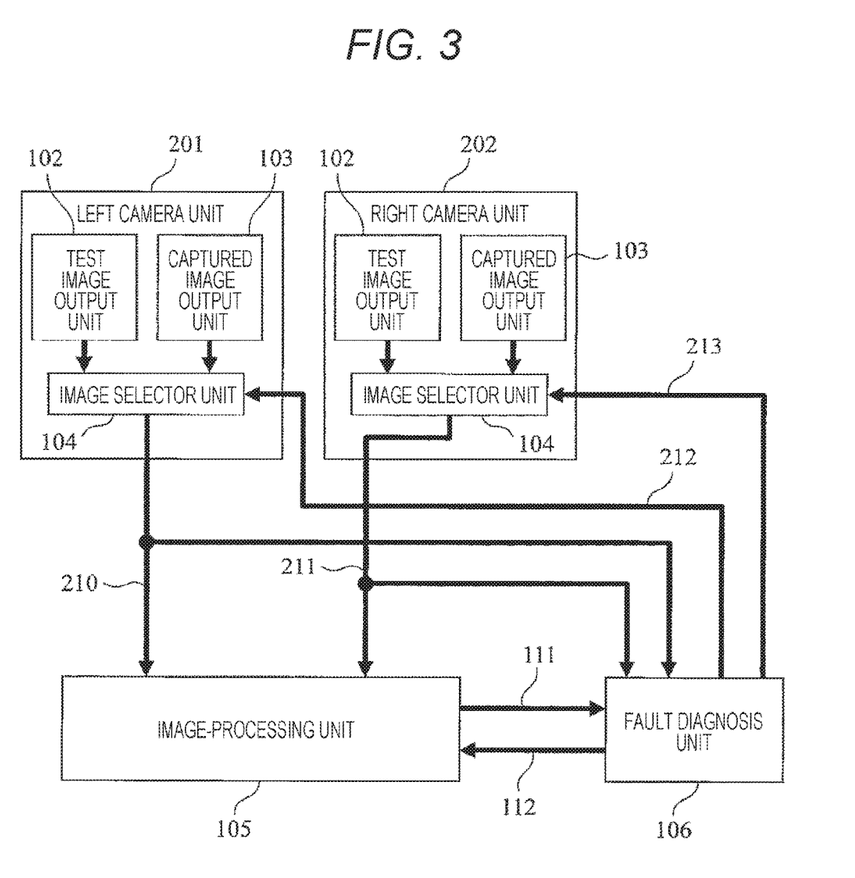
FIG. 3 is a diagram for describing a configuration of an in-vehicle-camera image processing device in a second embodiment.

In this embodiment, the description will be made about an example of an in-vehicle-camera image processing device provided with a plurality of camera units. FIG. 3 is a diagram for describing a configuration of the in-vehicle-camera image processing device. Further, the same components as those of the first embodiment will be denoted by the same symbols, and the detailed description thereof will be omitted.

The in-vehicle-camera image processing device of this embodiment includes two camera units 201 and 202 like a stereo camera. The left camera unit 201 and the right camera unit 202 each are provided with the test image output unit 102, the captured image output unit 103, and the image selector unit 104. The captured image of left camera image data 210 output from the left camera unit 201 and the captured image of right camera image data 211 output from the right camera unit 202 are input to the image-processing unit 105. For example, in the case of the stereo camera, a disparity image is calculated based on the right and left camera image data 210 and 211, and a distance between the subject vehicle and an obstacle such as the preceding vehicle is calculated.

As described in the first embodiment, when the fault diagnosis is possible, a left camera image-selection-instruction signal 212 is output to the left camera unit 201 and a right camera image-selection-instruction signal 213 is output to the right camera unit 202 by the fault diagnosis unit 106, and the right and left image selector units 104 can be controlled.

For example, the fault diagnosis unit 106 outputs the camera image-selection-instruction signal to one (some of the camera unit) of the right and left camera units 201 and 202, and the fault diagnosis may be performed by switching only the image output from the camera unit from the captured image to the test image. In addition, image-selection-instruction signal may be sequentially output to two camera units. For example, first, the camera image-selection-instruction signal is output to the camera unit, only the image output from the camera unit is switched from the captured image to the test image, and the fault diagnosis is performed on the camera unit. Then, the image output from the camera unit is returned from the test image to the captured image, only the image output from the other camera unit is switched from the captured image to the test image, and the fault diagnosis may be performed on the other camera unit.

Herein, only the left camera unit 201 may be switched to the test image, only the right camera unit 202 may be switched to the test image, or both images may be switched to the test image. Through these switchings, the diagnosis instruction information 111 of the image-processing unit 105 is transferred to the fault diagnosis unit 106, and the fault diagnosis is executed.

While a so-called monocular camera is considered in the first embodiment, the description herein will be made about an example of the stereo camera using FIG. 3.

For example, in a case where the preceding vehicle recognition is performed, the preceding vehicle detection processing unit 401 is activated in the driving control application 400. As a detection result of the preceding vehicle detection processing unit 401, in a case where the preceding vehicle is not detected and thus it is determined that there is no preceding vehicle in the front side of the subject vehicle, the test image is temporally selected to perform the fault diagnosis. In such a case, only one of the camera units may be diagnosed, both the camera units may be alternately diagnosed one by one, or both the camera units may be simultaneously diagnosed. As described in the first embodiment, the diagnosis can be executed in 33.3 ms in the case of the 30 fps in-vehicle-camera image processing device.

On the other hand, in a case where the preceding vehicle is detected in a remote area as a detection result of the preceding vehicle detection processing unit 401, it is desired to avoid the situation that the both camera units 201 and 202 are simultaneously switched to the test image for the fault diagnosis because of the preceding vehicle even when the remote area is far away to some degree that a pre-crash brake is not necessary.

In this case, while keeping on tracking the preceding vehicle in the remote area using the camera unit on one side (the one camera unit) in order not to miss the preceding vehicle, the fault diagnosis is performed on the camera unit on the other side (the other camera unit). Next, once the preceding vehicle is captured by the right and left cameras, the tracking function is switched to the camera unit (the other camera unit) subjected to the fault diagnosis, and the fault diagnosis is executed on the camera unit on the other side (the one camera unit).

Therefore, while the in-vehicle-camera image processing device does not miss the preceding vehicle even once, the fault diagnosis can be executed in real time while driving. Further, the description has been made about an example of the tracking, but the fault diagnosis may be alternately executed on the right and left cameras using any algorithm as long as the algorithm does not causes problem even when the right and left cameras are alternately subjected to the fault diagnosis. Further, in FIG. 4 described below, the fault diagnosis is denoted by Δ for the image recognition algorithm.

Then, in a case where the preceding vehicle is detected in a near field as a detection result of the preceding vehicle detection processing unit 401, it is considered as a case where the driving control of great emergency such as the pre-crash brake is performed, and thus the fault diagnosis is not necessarily performed.

Similarly, even in the case of the pedestrian detection processing or the oncoming vehicle detection processing, when the pedestrian or the oncoming vehicle is detected in a remote area, the camera unit on one side can be subjected to the fault diagnosis while tracking the object using the camera unit on the other side, so that the fault diagnosis can be executed in real time while driving.

In addition, in the lane detection processing and the road-side detection processing, in a case where there is no detected object, the fault diagnosis is possible. In a case where there is a detected object such as a lane or a road side, as described above, the fault diagnosis can be performed on the camera unit on one side while detecting the object the camera unit on the other side, so that the fault diagnosis can be executed in real time while driving.

In addition, in the traffic-signal detection processing and the traffic-sign detection processing, the fault diagnosis can be performed on each camera as described above only based on the detection result. However, for example, the fault diagnosis may be executed in combination with the external signal 410. In the first embodiment, the description has been made about an example of the vehicle speed information as the external signal 410, but the fault diagnosis may be executed in combination with map information of a navigation, a traffic-sign detection result, or a traffic-signal detection result.

As described above, in the in-vehicle-camera image processing device which includes the plurality of camera units and represented as the stereo camera, the fault diagnosis can be performed in real time while driving by using the detection processing function which is possible even in a so-called monocular camera in the camera unit on one side.

[Third Embodiment]

In this embodiment, the description will be made about an example of an in-vehicle-camera image processing device which performs the fault diagnosis based on a predetermined priority of the driving control applications in a case where a plurality of driving control applications are simultaneously executed in the image-processing unit.

Figure 4:
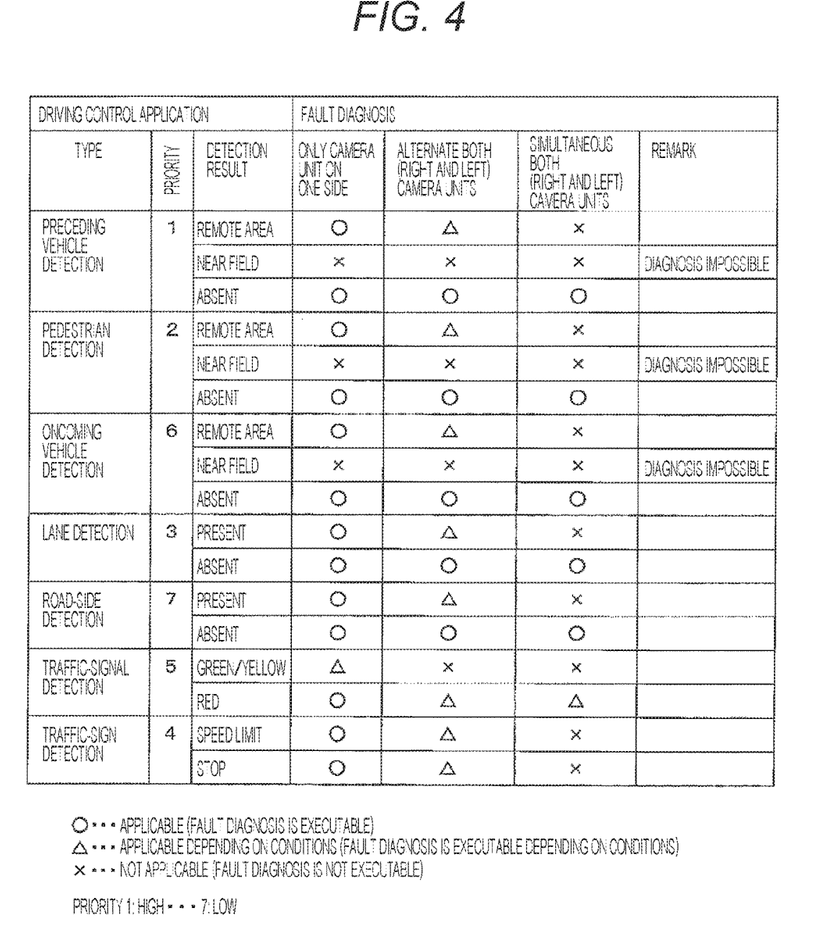
FIG. 4 is a table showing permission/inhibition of fault diagnosis and priority corresponding to a detection result of each driving control application.

FIG. 4 is a table showing the possibility and the priority of the fault diagnosis corresponding to the detection results of the respective driving control applications. In this embodiment, the priority is previously set to seven driving control applications. The priority of a small value indicates a high priority. For example, it is considered a case where a preceding vehicle detection application of Priority 1 and a lane detection application of Priority 3 are simultaneously executed. At any time, the preceding vehicle is detected in a remote area as a detection result of the preceding vehicle detection application (Detection result: Preceding vehicle in remote area), and the lane is not detected as a detection result of the lane detection application (Detection result: No detected lane).

In this case, since there is no detected lane in the lane detection processing, the fault diagnosis may be simultaneously executed on the both (right and left) camera units in a case where only the lane detection processing is considered. However, since the preceding vehicle detection of a high priority is simultaneously executed and there is the preceding vehicle in the remote area as the detection result, the fault diagnosis is allowed only to the camera unit on one side or to the both (right and left) camera units alternately depending on conditions. Therefore, the both (right and left) camera units are not simultaneously subjected to the fault diagnosis. Other combinations may be similarly considered.

Hitherto, the description has been made about an example in a case where the priorities of the plurality of driving control applications are determined in advance. However, even the priorities of the plurality of driving control applications are dynamically changed while driving, the fault diagnosis may be performed based on the priority at that time. According to the invention, the fault diagnosis can be performed based on the driving control application.

Hitherto, while the embodiments of the invention have been described in detail, the invention is not limited to the embodiments, and various variations in design can be made within a scope not departing from the spirit of the invention described in claims. For example, the above embodiments have been described in detail in order to help with understanding of the invention, but there is no need to provide all the configurations. In addition, some configurations of a certain embodiment may be replaced with those of another embodiment, and the configurations of a certain embodiment may be added to another embodiment. Furthermore, additions, omissions, and substitutions may be made on some configurations of each embodiment using other configurations.

REFERENCE SIGNS LIST 101 camera unit
102 test image output unit
103 captured image output unit
104 image selector unit
105 image-processing unit
106 fault diagnosis unit
110 camera image data
111 diagnosis instruction information
112 diagnosis result information
113 camera image-selection-instruction signal
201 left camera unit
202 right camera unit
210 left camera image data
211 right camera image data
212 left camera image-selection-instruction signal
213 right camera image-selection-instruction signal
400 driving control application
401 preceding vehicle detection processing unit (object detection processing unit)
402 pedestrian detection processing unit (object detection processing unit)
403 oncoming vehicle detection processing unit (object detection processing unit)
404 lane detection processing unit (object detection processing unit)
405 road-side detection processing unit (object detection processing unit)
406 traffic-signal detection processing unit (object detection processing unit)
407 traffic-sign detection processing unit (object detection processing unit)
410 external signal
411 diagnosis possibility determining unit
412 driving control application information

The invention claimed is:

1. An in-vehicle-camera image processing device which performs image processing on a captured image from outside of a vehicle, comprising:
    at least one camera unit which is able to selectively switch and output the captured image and a test image;

an image-processing unit which performs image processing on the captured image output from the camera unit; and a fault diagnosis unit which performs a fault diagnosis on the camera unit based on the test image output from the camera unit, wherein the image-processing unit determines whether the fault diagnosis is possible based on a result of the image processing, and outputs diagnosis instruction information to the fault diagnosis unit in a case where it is determined that the fault diagnosis is possible, and wherein the fault diagnosis unit outputs an image-selection-instruction signal, for switching the image output from the camera unit from the captured image to the test image, to the camera unit in a case where the diagnosis instruction information is input from the image-processing unit.

2. The in-vehicle-camera image processing device according to claim 1, comprising a plurality of the camera units, wherein the fault diagnosis unit outputs the image-selection-instruction signal to some of the camera units.

3. The in-vehicle-camera image processing device according to claim 2, wherein the fault diagnosis unit sequentially outputs the image-selection-instruction signal to the plurality of camera units.

4. The in-vehicle-camera image processing device according to claim 1, wherein the image-processing unit includes:

a plurality of detection processing units which detect external information through the image processing; and a diagnosis possibility determining unit which determines whether the fault diagnosis is possible based on detection processing results of the plurality of detection processing units and predetermined priorities of the plurality of detection processing units.

5. The in-vehicle-camera image processing device according to claim 1, wherein the image-processing unit includes an object detection processing unit which detects whether there is an object through the image processing, and wherein the fault diagnosis unit outputs the image-selection-instruction signal to the camera unit in a case where the object detection processing unit determines that there is no object.

6. The in-vehicle-camera image processing device according to claim 1, wherein the test image comprises a fixed pattern.

* * * * *